United States Patent
Zhang et al.

(10) Patent No.: US 12,361,279 B2
(45) Date of Patent: Jul. 15, 2025

(54) CLASSIFICATION MODEL CALIBRATION

(71) Applicant: Robert Bosch GmbH, Stuttgart (DE)

(72) Inventors: Dan Zhang, Leonberg (DE); Kanil Patel, Stuttgart (DE); William Harris Beluch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1116 days.

(21) Appl. No.: 17/240,108

(22) Filed: Apr. 26, 2021

(65) Prior Publication Data

US 2021/0365781 A1    Nov. 25, 2021

(30) Foreign Application Priority Data

May 20, 2020    (EP) ..................... 20175680

(51) Int. Cl.
  *G06N 3/08*    (2023.01)
  *G06F 17/16*    (2006.01)
  *G06F 17/18*    (2006.01)
  *G06N 3/047*    (2023.01)

(52) U.S. Cl.
  CPC ............. *G06N 3/08* (2013.01); *G06F 17/16* (2013.01); *G06F 17/18* (2013.01); *G06N 3/047* (2023.01)

(58) Field of Classification Search
  CPC .......... G06N 3/08; G06N 3/047; G06N 3/063; G06N 3/04
  See application file for complete search history.

(56) References Cited

PUBLICATIONS

Mozafari, Azadeh Sadat, et al. "Attended temperature scaling: a practical approach for calibrating deep neural networks." arXiv preprint arXiv:1810.11586 (2019). (Year: 2019).*
Pakdaman Naeini, M., Cooper, G., & Hauskrecht, M. (2015). Obtaining Well Calibrated Probabilities Using Bayesian Binning. Proceedings of the AAAI Conference on Artificial Intelligence, 29(1). https://doi.org/10.1609/aaai.v29i1.9602 (Year: 2015).*
Maroñas, Juan, Roberto Paredes, and Daniel Ramos. "Calibration of Deep Probabilistic Models with Decoupled Bayesian Neural Networks." arXiv preprint arXiv:1908.08972 (2020). (Year: 2020).*

(Continued)

*Primary Examiner* — Kamran Afshar
*Assistant Examiner* — Brian J Hales
(74) *Attorney, Agent, or Firm* — NORTON ROSE FULBRIGHT US LLP

(57) ABSTRACT

A computer-implemented method of calibrating a trained classification model. The trained classification model is trained to classify input samples according to a plurality of classes and to provide associated prediction probabilities, and includes a plurality of hidden layers and at least one activation layer. The method includes accessing the trained classification model and accessing a plurality of validation samples, each validation sample having a ground-truth label, the ground-truth label indicating a ground-truth class. The method further includes applying the trained classification model to the plurality of validation samples, obtaining, for each validation sample, an output logit vector from a layer of the trained classification model preceding a last activation layer, and training a calibration module. The calibration module is trained to adjust prediction probabilities, the prediction probabilities being derived from the output logit vectors.

15 Claims, 6 Drawing Sheets

(56) References Cited

PUBLICATIONS

Kumar, Ananya, Percy S. Liang, and Tengyu Ma. "Verified uncertainty calibration." Advances in Neural Information Processing Systems 32 (2019). (Year: 2019).*
Kumar et al., "Verified Uncertainty Calibration," Cornell University, 2020, pp. 1-38. <https://arxiv.org/pdf/1909.10155.pdf> Downloaded Apr. 23, 2021.
Mukhoti et al., "Calibrating Deep Neural Networks Using Focal Loss," Cornell University, 2020, pp. 1-28. <https://arxiv.org/pdf/2002.09437.pdf> Downloaded Apr. 23, 2021.
Kull et al., "Beyond Temperature Scaling: Obtaining Well-Calibrated Multiclass Probabilities With Dirichlet Calibration," Cornell University, 33rd Conference on Neural Information Processing Systems (NeurIPS), 2020, pp. 1-27.
Mozafari et al., "Attended Temperature Scaling: a Practical Approach for Calibrating Deep Neural Networks," Cornell University, 2019, pp. 1-10.

\* cited by examiner

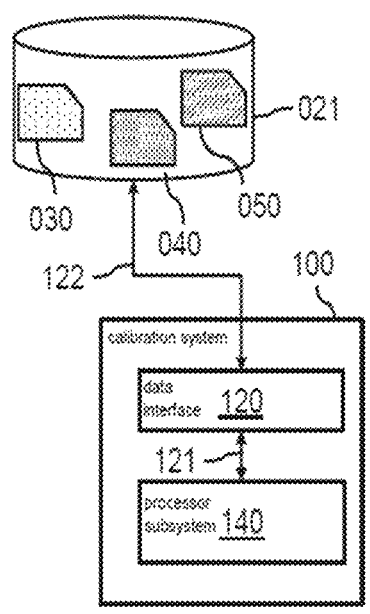
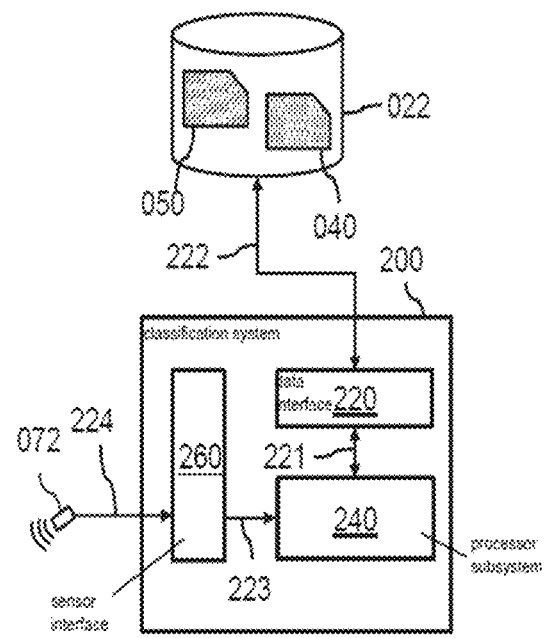
Fig. 1
Fig. 2

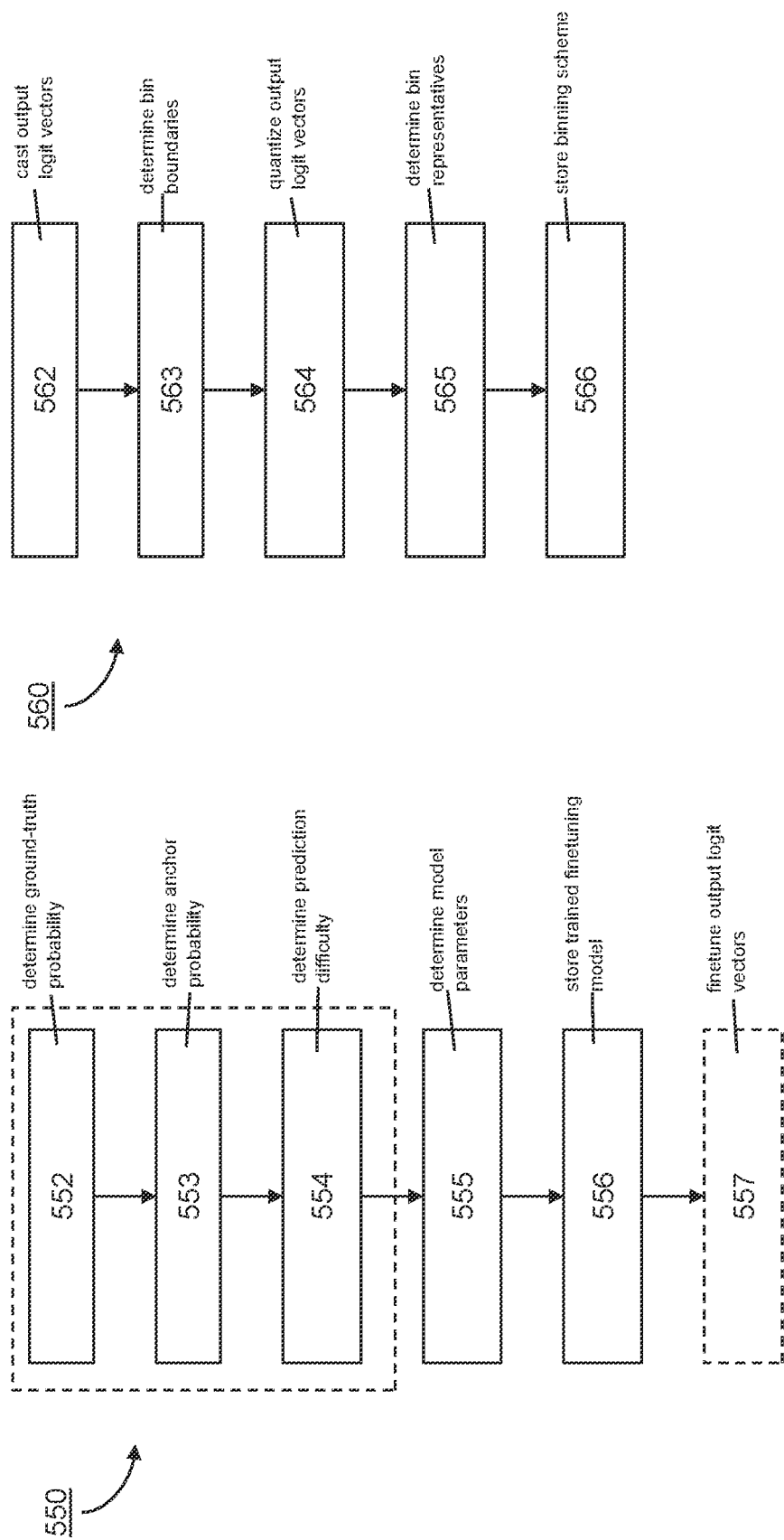

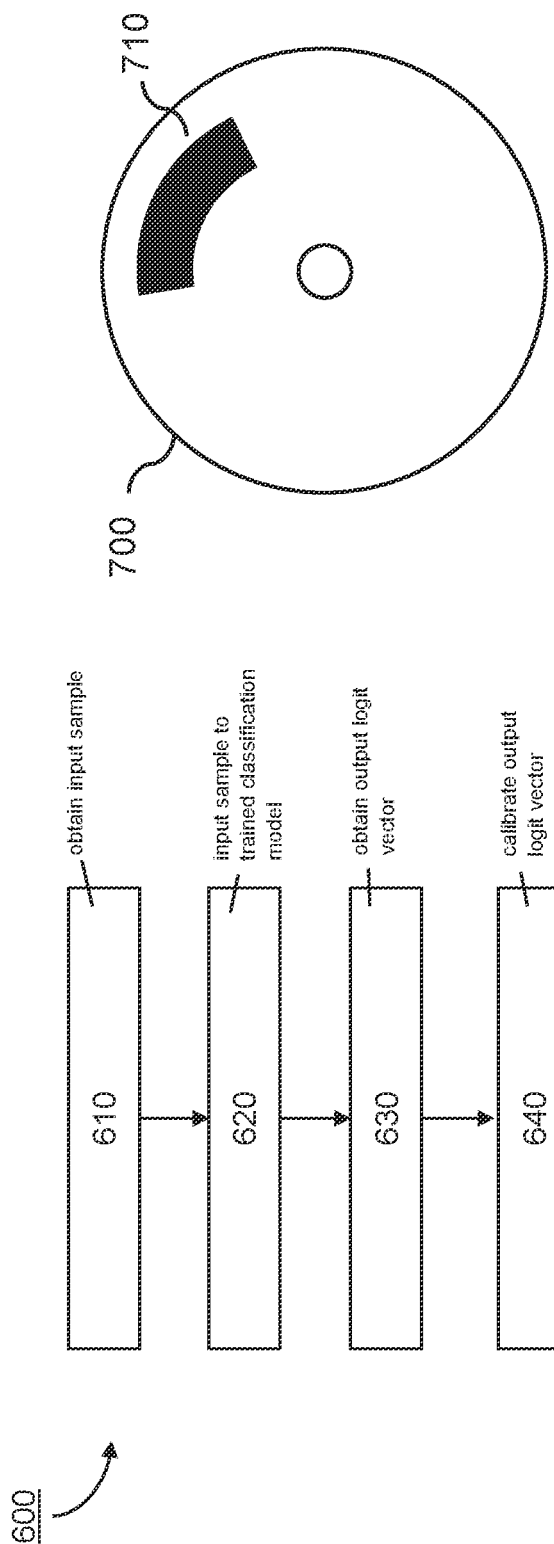

CLASSIFICATION MODEL CALIBRATION

CROSS REFERENCE

The present application claims the benefit under 35 U.S.C. § 119 of European Patent Application No. EP 20175680.6 filed on May 20, 2020, which is expressly incorporated herein by reference in its entirety.

FIELD

The present invention relates to a method for calibrating a trained classification model, to a system for calibrating a trained classification model, to a method for classifying an input image, to a system for classifying an input image, and to a computer-readable medium.

BACKGROUND INFORMATION

Machine-learned ('trained') models are widely used in many real-life application domains, such as autonomous driving, robotics, manufacturing, building control, etc. For example, machine learnable models such as neural networks may be trained to infer a state of a physical system, such as an autonomous vehicle or a robot, etc., or the system's environment, e.g., the road on which the vehicle is travelling, the robot's workspace, etc., based on sensor data which is acquired by one or more sensors. Having inferred the state, the physical system may be controlled, e.g., using one or more actuators, or its operation may be monitored.

Generally, as is conventional in machine learning, a machine-learnable model such as a neural network may be trained on training data in order to provide an output, such as a prediction or a decision. An example of a decision is a classification. By training the model, the model may provide such predictions or decisions without being explicitly programmed to do so. For example, for classifying an image, the model may be trained on a training dataset comprising images whose classifications are known to the model. Accordingly, the trained model may be trained to determine a classification of an input, such as an input image or input sound or text. For example, a model may be trained as a multiclass classifier, by which an image may be classified as, e.g., "cat", "dog", or "tree". Another example is that the trained model may be trained to be a binary classifier (e.g., classifying an input image into one of only two complementary categories, "OK" or "NOK").

In general, such models may comprise deep neural networks (DNNs), which are defined as having multiple layers between the input layer and the output layer.

The classifications by machine learned models such as trained neural networks may be used in myriad applications, such as optical quality inspection in manufacturing processes, or hazard detection in autonomous vehicles.

In recent years, machine learning models have been extensively and successfully used for classification tasks. These machine learning models, also known as classifiers or classifier models, may be configured to classify images, sound (e.g., speech) and many other forms of information. Typically, training a classifier model comprises providing a plurality of training samples which include the ground-truth classification is provided. For example, a training sample may be a picture of a cat, and the ground-truth classification would be provided as "cat". The model uses a large quantity of such training samples to train a multitude of model parameters. However, the number of model parameters to train typically far outnumbers the amount of training samples, which leads to overfitting to the negative log-likelihood (NLL) loss. This overfitting leads to overconfident predictions, which output predictions with a high degree of confidence that is not representative of its true classification ability. In other words, the model appears to be better trained than it really is. Overconfident predictions cannot be relied upon as they do not reject risky predictions, meaning the classification models cannot be used reliably in application such as sensor fusion, in which the importance of different sensors is weighted when fusing predictions therefrom. The topic of predictive confidence calibration is therefore the focus of considerable research efforts.

Perfect calibration of a trained classification model means that the true label distribution of some repetitive event matches the predictive distribution made by the model. The calibration concerns the model's performance over a series of predictions, rather than on any single prediction. For example, a well-calibrated classifier that predicts "Dog" with a probability of 80% should be correct 80% of the time. This is typically evaluated by applying a plurality of validation and/or test samples, of which the ground-truth classifications are known, determining the probability of a particular class (e.g., "Dog", "Tree", etc.) and determining if the model correctly predicts that class with a corresponding frequency. To this end, there should be a sufficient number of validation samples such that the model outputs the same predictive distribution so that the ground truth label distribution can be well approximated by means of frequency estimation over a finite set of samples. For models that output continuous predictive distributions, sample-based calibration evaluation requires binning to quantize the outputs.

There exist several model optimizations that are employed during the training of the model, which aim to improve the calibration. For example, modifying the training loss to incorporate a calibration error, sampling-free model uncertainty estimation, data augmentation techniques and ensemble distribution distillation can all be implemented during the training of the model and aim to improve calibration. However, these approaches are resource-demanding and highly complex, requiring high overhead and introducing significant latency. In many cases, it is desirable to instead calibrate a model after the model has been trained (e.g., post-hoc) in such a way that no retraining or modification of the model is needed.

There are several approaches that may be used for post-hoc (e.g., after training of the model) calibration, including finetuning, also known as scaling, and binning. Calibration performance is highly dependent on the binning scheme used for quantizing the prediction probabilities, or logits. Typically, the binning scheme, including determining bin edges (also known as bin boundaries) and bin representatives, is performed after the model has been trained. The most common criteria for defining bin edges are equal distance binning, in which the width of each bin is equal and an interval is divided evenly into a plurality of bins, and equal mass binning, in which the bin edges are defined such that each bin has the same number of samples therein (this is also known as equal frequency binning).

However, binning causes information loss. As an example, the use of a small number of bins results in a coarse quantization, which loses a large amount of information—all samples within a bin are represented by a single value, and when the samples in a bin have significantly different values, approximating them all by a single value loses information about disparate samples. Using finer bins (e.g., a large number of bins) is typically infeasible, as the validation set has a limited number of samples. The two commonly used binning schemes, equal distance binning and equal mass binning, ignore the facts that (i) the label information conveyed by the logit is of primary interest, and (ii) the logit itself also encodes class-irrelevant data information.

Finetuning is a post-processing solution based on a simple finetuning model which adjusts the raw logits and a loss function to optimize the finetuning model parameters on the validation set. When finetuning the logits, a loss function is used to penalize misclassified samples and encourage correct classification in an effort to reduce overconfidence. Negative log-likelihood (NLL) and Brier score are commonly used loss functions. In such loss functions, the misclassification samples, also referred to as members of the negative class, are the driving force for penalizing overconfident predictions, whilst the correctly classified samples, belonging to the positive class, encourage more confident predictions. The positive class and the negative class are naturally unbalanced for any properly trained classification model. However, both the NLL loss and the Brier score loss simply treat the minority negative class equally to the majority positive class. Thus, these approaches fail to make the best use of the relatively few misclassified samples.

The paper "Verified Uncertainty Calibration" by Kumar et al, arXiv preprint arXiv:1909.10155, 2019 (https://arxiv.org/pdf/1909.10155.pdf) describes how the calibration error of continuous methods is generally underestimated and proposes a method for post-hoc calibration involving both scaling and binning. The method involves first fitting a parametric scaling and then binning the outputs of the scaling function values to ensure calibration. The paper describes how a uniform-mass binning scheme is chosen over an equal-width binning in order to be able to estimate the calibration error.

The paper "Calibrating Deep Neural Networks using Focal Loss" by Mukhoti et al, arXiv preprint arXiv:2002.09437, 2020, (https://arxiv.org/pdf/2002.09437.pdf) describes training a model in which the training comprises taking into consideration a focal loss, in order to achieve a more naturally calibrated trained model. The paper describes how the use of focal loss during training directs the attention of the model towards samples for which it is currently predicting a low probability for the correct class.

SUMMARY

It may be desirable to calibrate a trained classification model in a sample-efficient manner, without needing to retrain a classification model or adjust any of the parameters thereof. Sets of validation samples are of finite size. Validation samples are typically created by capturing data, such as photographs or images, and having people manually classify objects in each image or photograph. In many situations, it is time-consuming and often impractical to generate high volumes of validation samples. Calibrating the trained classification model in a sample-efficient way thus reduces overconfident predictions and allows decisions based on classifications to be made with an accurate indication of prediction uncertainty.

In accordance with the first aspect of the present invention, a computer-implemented method and corresponding calibration system for calibrating a trained classification model by training a calibration module which can be appended to the trained classification model are provided. In accordance with an aspect of the present invention, a computer-implemented method and corresponding classification system for classifying an input sample using a calibrated classification model, the calibrated classification model comprising the calibration module appended to the trained classification model, are provided. In accordance with another aspect of the present invention, a computer-readable medium is provided.

Various aspects of the present invention relate to the calibration of a trained classification model and use of a calibrated classification model comprising a trained calibration module appended to the trained classification model. A trained classification model may be trained to classify input samples according to a plurality of classes and to provide associated prediction probabilities, and may comprise a plurality of hidden layers and at least one activation layer. The trained classification model may be calibrated by training a calibration module, without the need for retraining the trained classification model or changing its parameters. The trained classification model may be applied to a plurality of validation samples, each validation sample having a ground-truth label which indicates the ground-truth class of that sample. For example, if a validation sample is an image of a cat, the ground-truth class would be "cat". For each validation sample, an output logit vector may be obtained from the layer of the trained classification model preceding the last activation layer. The output logit vectors of the plurality of validation samples may then be used to train a calibration module. The calibration module may comprise a finetuning submodule, a binning submodule, or both, for adjusting the prediction probabilities. The calibration module may be trained to calibrate, or adjust, prediction probabilities by determining adjusted prediction probabilities based on the output logit vectors. Once trained, the calibration module may be appended to the trained classification module to obtain a calibrated classification model.

By training a calibration module using the output logit vectors obtained from the trained classification model, it is possible to calibrate the prediction probabilities without needing to retrain or adjust the model parameters of the trained classification model. As the calibration module accepts the output logit vector(s) as input, a calibration module can be trained in the same way (e.g., using the same methodology), without modification, for many classification models, without knowing how a classification model was trained.

The use of a calibrated classification model enables a sample to be classified with an accurate prediction probability. Classifying samples with an accurate prediction probability is important, for example when a system makes autonomous decisions based on the classifications, such as in autonomous vehicles and automated optical inspection. Sensor fusion applications also rely on prediction probabilities when determining how to bring inputs from multiple remote sensors together to form a single model.

In accordance with an example embodiment of the present invention, optionally, the calibration module comprises the binning submodule for adjusting the prediction probabilities by binning the output logit vector. The binning submodule comprises a binning scheme which defines bin boundaries and bin representatives. Bin representatives may be used as the adjusted prediction probabilities. Training the calibration module may comprise determining the binning scheme. The binning scheme may be determined by, for each validation sample, casting the output logit vector into a set of binary classifications, each binary classification comprising a binary label and an associated scalar logit. It is desirable to define the bin boundaries in such a way as to maximize the mutual information between the binary label and the resulting quantized scalar logits. An equivalent problem may be defined—that is, minimizing a binning loss function parameterized by bin boundaries and a set of auxiliary variables is equivalent to maximizing the mutual information. The bin boundaries may thus be determined by minimizing the binning loss function. After determining the bin boundaries, the scalar logits of the validation samples may be quantized by binning the scalar logits according to the determined bin boundaries. Then, for each bin, a bin representative value may be determined for representing the scalar logits within said bin. The bin boundaries and bin representatives may then be stored, thus defining the binning scheme in the calibration module.

Binning samples inherently causes information about those samples to be lost, and often leads to a reduction in accuracy after calibration. However, by defining a binning scheme based on the maximization of mutual information, preservation of the crucial information relating the label information to the logits is improved. This improves sample efficiency and accuracy after binning and therefore enables reliable calibration of the logits even when the number of validation samples available is low, whilst maintaining the accuracy of the classification.

Quantizing the logits based on the binning scheme determined as described above has further benefits in the field of remote sensor fusion. For example, if sensors are remotely connected to a centralized node, the logits (e.g., prediction confidences or prediction probabilities) are required at the centralized node in order to determine how the sensor outputs should be fused. When using wireless communication to send the logits at the local sensors to the centralized node, quantization is a necessary step. It is important to ensure that the bit budget is met to fulfill the transmission energy consumption and latency constraints imposed by applications. This is particularly beneficial in segmentation tasks, which require a high number of bits for encoding a multi-class distribution per pixel. Quantizing, or binning, the logits based on mutual information as described improves bit encoding efficiency.

In accordance with an example embodiment of the present invention, optionally, minimizing the binning loss function comprises updating at least one of the bin boundaries and the auxiliary variables by using at least one of a gradient descent and a closed form calculation.

Gradient descent and closed form calculations enable the bin boundaries and auxiliary variables to be updated iteratively and in a straightforward manner. Updating the bin boundaries and/or the auxiliary variables using a closed-form calculation is resource-efficient and quicker than using gradient descent, although requires certain mathematical criteria to be met (for example, it may not be possible to directly calculate a minimum of the binning loss function in every case). The use of gradient descent is thus useful if the minimum of the binning loss function is not directly calculable, for example.

In accordance with an example embodiment of the present invention, optionally, determining the bin representative for each bin comprises determining a proportion of validation samples whose corresponding scalar logits fall within said bin, the proportion of validation samples having the same ground truth label, and setting the bin representative of said bin to be a prediction probability corresponding to the determined proportion.

Determining the bin representative in this kind of sample-based manner with bins defined based on maximizing mutual information provides a simple yet accurate calibration of the prediction probabilities.

In accordance with an example embodiment of the present invention, optionally, casting the output logit vector into the set of binary classifications comprises one of: a) calibrating the top k predictions as binary classifications using a top-k calibration, k being an integer, b) calibrating a prediction for each class of the plurality of classes using a class-wise calibration and c) calibrating a prediction for each class of the plurality of classes using a shared class-wise calibration.

Depending on the size of the set of validation samples, different methods of casting the output logit vector may be employed. For example, the shared class-wise calibration is particularly beneficial when the number of validation samples available is small. If there are K classes, the validation set for class-wise calibration becomes K times larger.

In accordance with an example embodiment of the present invention, optionally, the calibration module comprises the finetuning module and training the calibration module comprises training a finetuning model. Parameters of the finetuning model are determined by, for each validation sample of the plurality of samples:
  determining a ground truth probability from the output logit vector, the ground-truth probability being the predicted probability associated with the ground-truth class of said validation sample,
  determining an anchor probability from the output logit vector, the anchor probability being a highest probability of an incorrect class, and
  determining a prediction difficulty by subtracting the ground-truth probability from the anchor probability.

Model parameters of the finetuning model are then determined by minimizing a finetuning loss function averaged over the plurality of validation samples. The finetuning loss function comprises a modulation term based on the prediction difficulty for each validation sample. The determined model parameters define the trained finetuning model. The trained finetuning model is then stored in the calibration module.

By modulating the finetuning loss function based on the prediction difficulty, a sample efficient finetuning model can be determined. The use of the anchor probability improves the weighting of the finetuning loss function of the negative (misclassified) and positive (correctly classified) samples.

In accordance with an example embodiment of the present invention, optionally, the finetuning loss function comprises at least one of a negative log-likelihood function, a Brier score function and a hinge loss function.

These loss functions are well suited to finetuning logits and can be used even after the classification model is trained, e.g., in post-hoc calibration.

In accordance with an example embodiment of the present invention, optionally, the finetuning loss function is based on a parametric model such as a matrix scaling model and/or a Dirichlet calibration model.

These parametric models may be trained by determining the parameters of the models by minimizing the finetuning loss function. Both the matrix scaling model and the Dirichlet calibration model are low in complexity when compared to Gaussian Processes, for example, thus saving resources and reducing power consumption.

In accordance with an example embodiment of the present invention, optionally, the output logit vector of each validation sample is finetuned according to the trained finetuning model prior to being quantized for determining the binning scheme. Determining the bin representative for each bin may then comprise, for each scalar logit falling within the bin, calculating a sigmoid response of the scalar logit, determining an average of the calculated sigmoid responses of the scalar logits falling within the bin, and setting the bin representative of the bin to be the determined average.

The use of average of the sigmoids improves the determination of the bin representative even in cases where a bin is relatively unpopulated. For example, if only a few scalar logits are in a particular bin, calculating the bin representative based on the average of the sigmoids reduces the estimation error which can occur when using a frequency-based approach for determining the bin representative. In the average-sigmoid approach, however, the finetuned logits are considered to be post-calibrated before binning, improving the sample efficiency.

It will be appreciated by those skilled in the art that two or more of the above-mentioned embodiments, implementations, and/or optional aspects of the present invention may be combined in any way deemed useful.

Modifications and variations of the computer-implemented method or any computer-readable medium, which correspond to the described modifications and variations of the system, can be carried out by a person skilled in the art on the basis of the present description, and vice versa.

BRIEF DESCRIPTION OF THE DRAWINGS

These and other aspects of the present invention are apparent from and will be elucidated with reference to the embodiments described hereinafter.

FIG. 1 shows a system for training a calibration module for a trained classification model according to an example embodiment of the present invention.

FIG. 2 shows a system for classifying an input instance according to an example embodiment of the present invention.

FIG. 5b shows a computer-implemented method for training a calibration module using finetuning according to an example embodiment of the present invention.

FIG. 5c shows a computer-implemented method for training a calibration module using a binning optimization scheme according to an example embodiment of the present invention.

FIG. 6 shows a computer-implemented method for classifying an input instance according to an example embodiment of the present invention.

FIG. 7 shows a computer-readable medium comprising data, in accordance with an example embodiment of the present invention.

Figure 3:
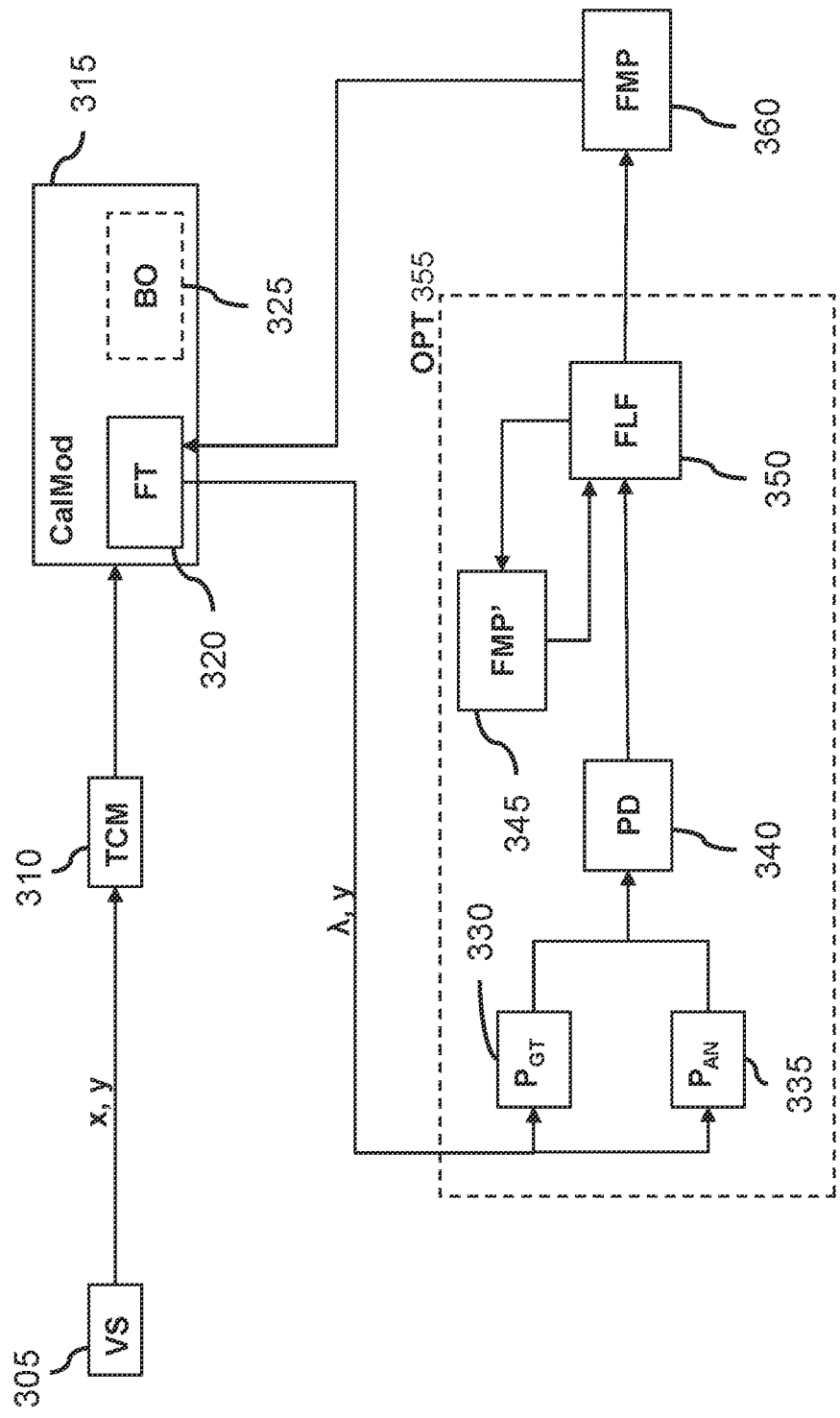
FIG. 3 shows a detailed example of training a calibration module using a finetuning approach according to an example embodiment of the present invention.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EXAMPLE EMBODIMENTS

The following relates to a calibration system and corresponding computer-implemented method for calibrating a trained classification model, as well as a classification system and corresponding computer-implemented invention for classifying an input instance. The calibration system and the classification system are described with reference to FIGS. 1 and 2, respectively, whilst the computer-implemented calibration method is described in detail with reference to FIGS. 3 to 5, and the computer-implemented classification method is described with reference to FIG. 6.

FIG. 1 shows a calibration system 100 for calibrating a trained classification model according to an example embodiment of the present invention. Calibrating the trained classification model may comprise training a calibration module. The calibration module may be trained such that it may be appended to a trained classification model. The trained classification model may comprise a deep neural network (DNN) having a plurality of layers between an input layer, into which a sample (such as a validation sample) is input, and an output layer which outputs a classification of the sample and an associated prediction probability. The DNN may comprise an activation layer which takes logits as inputs. The activation layer may be, for example, a softmax activation layer or a sigmoid activation layer. For example, the softmax function or the sigmoid function may be used to transform the logits, which may be any real numbers, to a probability distribution.

The calibration system 100 may comprise a data interface 120 and a processor subsystem 140 which may be configured to communicate internally via data communication 121. The data interface 120 may enable access of data 040 defining the calibration module and model data 050 defining the trained classification model. The data 040 may comprise at least a set of parameters of a finetuning model and/or a set of parameters of a binning scheme. The data interface 120 may further be used to enable access of a set of validation samples 030, each sample comprising an input instance, such as an image, and a ground-truth classification. The model data 050 may be used in conjunction with the model data 030 for the classification of an input sample according to a method described herein, such as by the classification system 200 of FIG. 2.

The processor subsystem 140 may be configured to, during operation of the calibration system 100 and using the data interface 120, access data 030, 040, 050. For example, as shown in FIG. 1, the data interface 120 may provide access 122 to an external data storage 021 which may comprise said data 030, 040, 050. Alternatively, the data 030, 040, 050 may be accessed from an internal data storage which is part of the calibration system 100. Alternatively, the data 030, 040, 050 may be received via a network from another entity. In general, the data interface 120 may take various forms, such as a network interface to a local or wide area network, e.g., the Internet, a storage interface to an internal or external data storage, etc. The data storage 021 may take any known and suitable form.

The processor subsystem 140 may obtain a set 030 of validation samples. A validation sample may be, for example, an image, a document comprising text, an audio file, a sensor output and/or the like. Each validation sample further comprises a ground-truth classification. In other words, the classification of each validation sample is known. In the figure, the validation samples are accessed via data interface 120, but this is not needed, e.g., validation samples may be obtained from a sensor during training of the calibration module. In such cases, the ground-truth classification of each sample may also be input.

The processor subsystem 140 may train the calibration module based on the set 030 of validation samples. The calibration module may be configured to receive, as input, an output logit vector comprising K logits corresponding to each of K classes from a layer of the trained classification model for each validation sample. The output logit vector may be the output of a layer of the trained classification model preceding the last activation layer.

The calibration module may comprise a finetuning submodule, a binning submodule or both. The finetuning submodule may be configured to optimize model parameters of a finetuning model by minimizing a finetuning loss function averaged over the plurality of validation samples. For each validation sample, the prediction difficulty may be determined by subtracting the probability associated with the ground-truth class of the sample from the probability associated with the incorrect class having the highest probability. The probability associated with the incorrect class having the highest probability may be referred to as the anchor probability. For example, a classifier may be configured to classify a sample into one of the classes "cat", "tree" and "fish". If a sample has a ground-truth class of "cat", then "tree" and "fish" would be the incorrect classes. In this example, the classifier determines that the probability of the sample being in the "tree" class is 0.35, and the probability of the sample being in the "fish" class is 0.15. Of these incorrect classes, the most probable class is therefore "tree", because the probability of "tree" is higher than that of "fish". Then, the probability corresponding to "tree", 0.35, would be the anchor probability.

The finetuning loss function may comprise a modulation term which is based on the prediction difficulty. This will be described in more detail with reference to FIG. 3.

The binning module may be configured to determine a binning scheme through which the output logit vector may be quantized. The binning scheme defines the bin boundaries, also referred to as bin edges, into which the output logit vector is to be quantized, and the bin representatives, which are the values assigned to each bin. The binning scheme may be optimized by finding a quantization function that maximizes the mutual information between the label information and the logits. This will be described in detail with reference to FIG. 4.

As an optional component, the calibration system 100 may comprise a sensor interface (not shown) for obtaining, from one or more sensors, sensor data to be used as input to the classification model. Based on this sensor data, a sensor output, such as an image from a camera, may be determined for use as a validation sample in training the calibration module. For example, the measurement may comprise or be based on one or more sensor readings. Sensor interfaces are also described with respect to FIG. 2.

Figure 4:
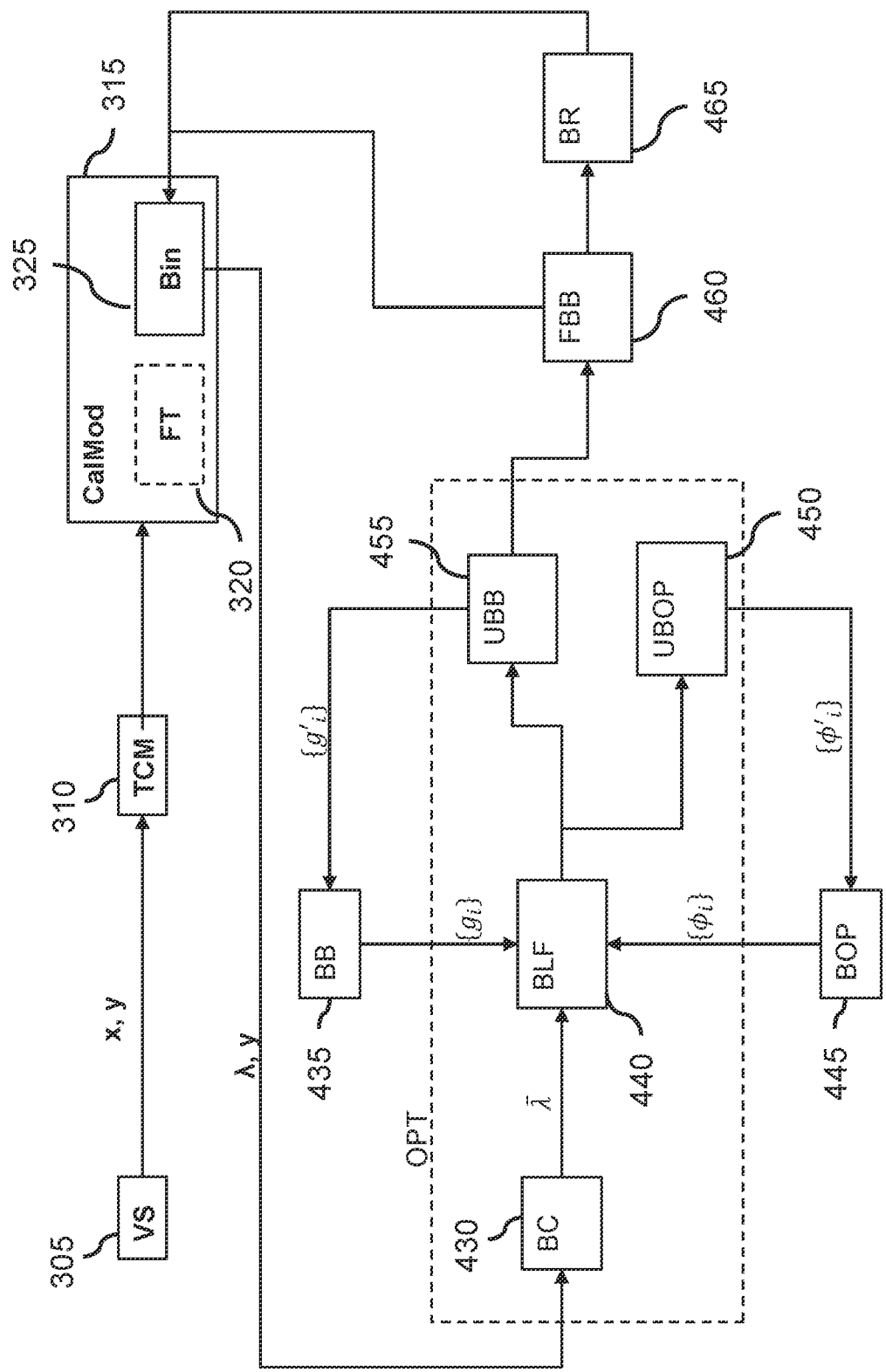
FIG. 4 shows a detailed example of training a calibration module using a binning optimization scheme according to an example embodiment of the present invention.

Various details and aspects of the operation of the calibration system 100 will be further elucidated with reference to FIGS. 3 and 4, including optional aspects thereof.

In general, the calibration system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a nonvolatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the calibration system 100 may be implemented in the form of a circuit. It is noted that the calibration system 100 may also be implemented in a distributed manner, e.g., involving different devices or apparatuses, such as distributed servers, e.g., in the form of cloud computing.

FIG. 2 shows a classification system 200 for classifying an input sample. The classification system 200 may use a calibrated classification model, the calibrated classification model comprising the trained classification model with the trained calibration module appended thereto.

The classification system 200 may comprise a data interface 220 and a processor subsystem 240 which may be configured to internally communicate via data communication 221. Data interface 220 may be for accessing trained classification model data 040 defining the trained classification model, and calibration module data 050 defining the calibration module. The classification model data 040 may comprise at least a set of parameters (e.g., weights) of a DNN. The calibration module data 050 may comprise at least a set of parameters defining at least one of a finetuning model and an optimized binning scheme. The calibration module may be trained according to a training method as described herein, e.g., by calibration system 100 of FIG. 1. The trained classification model may be any trained classification model trained by any training system. The use of the calibration module enables a post-hoc calibration without any retraining of the classification model or any adjustments to the parameters of the classification model. The classification system 200 may also be configured to train the model in addition to applying it, e.g., classification system 200 may be combined with calibration system 100 of FIG. 1.

The processor subsystem 240 may be configured to, during operation of the system 200 and using the data interface 220, access data 040, 050. For example, as shown in FIG. 2, the data interface 220 may provide access 222 to an external data storage 022 which may comprise said data 040, 050. Alternatively, the data 040, 050 may be accessed from an internal data storage which is part of the classification system 200. Alternatively, the data 040, 050 may be received via a network from another entity. In general, the data interface 220 may take various forms, such as a network interface to a local or wide area network, e.g., the Internet, a storage interface to an internal or external data storage, etc. The data storage 022 may take any known and suitable form.

The processor subsystem 240 may be configured to, during operation of the classification system 200 and using the data interface 220, obtain the trained classification model, the trained calibration module and data, such as sensor data, used to classify an input sample. The classification of the input sample may be used, for example, in automated optical inspection, hazard detection in autonomous driving, or in sensor fusion.

The processor subsystem 240 may be configured to obtain an output logit vector from a layer of the trained classification model preceding the last activation layer. The processor subsystem 240 may then provide the output logit vector as an input to the trained calibration module, which is configured to adjust, in other words calibrate, a prediction probability. A prediction probability is typically derived from an output logit vector, and calibrating the output logit vector adjusts the prediction probability derived from said output logit vector. In other words, by calibrating, or adjusting, the output logit vector, the prediction probability derived from the output logit vector is adjusted or calibrated. Calibrating the output logit vector may also be referred to as adjusting a prediction probability. The trained calibration module may comprise at least one of a trained finetuning model and a binning scheme in order to adjust the output logit vector, and therefore the prediction probability. In some embodiments, the output logit vector may be finetuned by applying the output logit vector to the trained finetuning model, to obtain a finetuned output logit vector. In some embodiments, the output logit vector may be binned according to a defined binning scheme based on maximizing mutual information. In some embodiments, the output logit vector may be finetuned by the finetuning model prior to being binned, or quantized, by the defined binning scheme. The binning scheme may quantize the output logit vector (or the finetuned logit vector) and may output a calibrated prediction probability.

The output of the trained calibration module may then be used as the classification of the input sample. In some embodiments, the classification, including the adjusted prediction probability, may be output by the calibration module. In some embodiments, the adjusted prediction probability may be output by the calibration module whilst the classification decision (e.g., the most probable class or top-k classes, etc.) may be output by the classification model.

In embodiments in which the trained calibration module comprises the binning submodule, the output of the trained calibration module may comprise the quantized output logits. This is particularly advantageous, for example, in sensor fusion. In sensor fusion, a plurality of sensors may be remotely connected to a centralized node, such as a cloud. In order to fuse a decision, it is often not sufficient to transmit the hard decision (e.g., the top-predicted class) to the cloud. In these cases, it is preferable to send the quantized logits. Quantization enables wireless communication to transmit the information to the cloud only transmits binary bits, and cannot transmit directly continuous values. Whilst this may not be a performance-limiting factor in image classification, the bit budgets associated with segmentation tasks can be limited. By transmitting the quantized logits, the transmitted bits efficiently encode the label information.

As an optional component, the classification system 200 may comprise a sensor interface 260 for obtaining, from one or more sensors, sensor data 224 to be used as an input sample to be classified. As a non-limiting example, a single sensor 072 is shown in the figure. Sensor interface 260 may internally communicate with processor subsystem 240 via data communication 223. The sensor data 224 may comprise an image, an audio output (e.g., audio file), text, video, a sensor output such as lidar, radar, ultrasonic sensor, or the like.

The sensor interface 260 may be configured for various types of sensor signals, e.g., measurements of various physical quantities such as temperature, pressure, light intensity, motion, acceleration, and various signals based on which such various physical quantities may be determined, e.g., video signals, radar/LiDAR signals, ultrasonic signals, etc. The sensor(s) 072 can be arranged in the computer-controlled entity, but remote sensing is also possible. Sensor interface 260 may also access the sensor data from elsewhere, e.g., from a data storage or a network location. Sensor interface 260 may have any suitable form, including but not limited to a low-level communication interface, e.g., based on 120 or SPI data communication, but also a data storage interface such as a memory interface or a persistent storage interface, or a personal, local or wide area network interface such as a Bluetooth, Zigbee or Wi-Fi interface or an ethernet or fiberoptic interface. Sensor 072 may be included in classification system 200.

As an optional component, the classification system 200 may comprise a display output interface or any other type of output interface (not shown) for outputting one or more determined classifications to a rendering device, such as a display. For example, the display output interface may generate display data for the display causing the display to render the one or more predictions in a sensory perceptible manner, e.g., as an on-screen visualisation.

The determined classification can be used for controlling a computer-controlled system. For example, this computer-controlled system can include the classification system 200 itself, or classification system 200 may communicate with an external computer-controlled system for controlling it, e.g., by providing a classification.

For example, classification system 200 may be coupled to a computer-controlled system for interacting with an environment, e.g., a robotics system, an automated optical inspection system, or an autonomous driving system. The classification system 200 may be coupled to an actuator interface (not shown). The actuator interface may be for providing, to an actuator, actuator data causing the actuator to effect an action in the environment. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Processor subsystem 240 may be configured to determine the actuator data based on a classification, e.g., a classification of a hazard detected in an autonomous vehicle system may result in a particular adaptation of vehicle control (e.g., braking, swerving, or the like).

In general, the classification system 200 may be embodied as, or in, a single device or apparatus, such as a workstation, e.g., laptop or desktop-based, or a server. For example, the classification system 200 may be an embedded computer, such as part of a control system of the computer-controlled entity, e.g., built into an autonomous vehicle or robotic agent. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the classification system 200 may also be implemented in a distributed manner, e.g., involving different devices or apparatuses, such as distributed servers, e.g., in the form of cloud computing.

FIG. 3 shows a detailed, yet non-limiting, example of training a calibration module using a finetuning approach according to an embodiment of the present invention.

A plurality of validation samples VS 305 may be provided to a trained classification model TCM 310. Each validation sample comprises an input instance, such as an image, video, document or the like, and a ground-truth classification which indicates the true classification of the input instance. The trained classification model TCM 310 may be a classification model that has been previously trained, either by a training method within the same system as calibration system 100, or an external training system. The trained classification model TCM 310 may comprise a deep neural network. The trained classification model TCM 310 may be a multiclass classifier configured to classify an input into one or more of K classes and to provide associated prediction probabilities, for example a multiclass multilabel classifier which can classify a single input into multiple classification labels.

After inputting a validation sample VS 305 to the trained classification model TCM 310, an output logit vector may be obtained from the trained classification model TCM 310. More specifically, the output logit vector may be the output of a layer of the DNN preceding the last activation layer of the trained classification model TCM 310. The last activation layer may be, for example, a softmax activation layer or a sigmoid activation layer. For example, if the trained classification model TCM 310 is trained to classify a sample into one or more of K classes, the output logit vector λ may be $\lambda = \{\lambda_0, \ldots, \lambda_K\}$. Typically, a prediction probability is derived from an output logit vector. The calibration module determines an adjusted prediction probability by adjusting, or calibrating, the output logit vector.

The output logit vector may be input into a calibration module CalMod 315. The calibration module CalMod 315 may comprise at least one of a finetuning submodule FT 320 and a binning submodule Bin 325. The method associated with the binning submodule Bin 325 will be discussed with reference to FIG. 4. In some embodiments, the calibration module CalMod 315 comprises the finetuning submodule FT 320, with the binning submodule Bin 325 being optional. This is illustrated in FIG. 3 by a dashed border box for the binning submodule Bin 325.

Referring now to the finetuning submodule FT 320, the finetuning submodule FT 320 receives, as input, the output logit vector from the trained classification model TCM 310. The finetuning submodule FT 320 may comprise a finetuning model, such as a matrix scaling model, a Dirichlet calibration model, temperature scaling, vector scaling or a Beta model, although this list is not exclusive. The finetuning model may be a parametric model, which accepts the output logit vector λ as input. In some examples, a Gaussian Process may be used, although a parametric model is preferable in order to reduce complexity.

The matrix scaling model and the Dirichlet calibration model are shown below:

$$\lambda_{Mtx} = W\lambda + b \quad \text{(Eq. 1)}$$

$$\lambda_{Dir} = W \log \text{softmax}(\lambda) + b \quad \text{(Eq. 2)}$$

where W is a square matrix and b is a bias vector. Both W and b are trainable parameters of the finetuning model.

In other words, training the finetuning submodule FT 320 may comprise training the parameters of such a model. Throughout the description, example calculations will be shown based on the matrix scaling model shown in Eq. 1. However, other known models may be analogously employed.

In order to train parameters of the finetuning model, a finetuning loss function FTF 350 may be used. The finetuning loss function FTF 350 may be based on a negative log-likelihood (NLL) loss, a Brier score loss, a hinge loss or the like. In the following description, a NLL loss will be used for the sake of illustration:

$$NLL: \; -\frac{1}{S} \sum_{s=1}^{S} \log \tilde{q}_{gt(s),s}; \; \tilde{q}_{k,s} \triangleq \text{softmax}_k(W\lambda_s + b) \quad \text{(Eq. 3)}$$

where S denotes the number of samples, gt(s) denotes the ground truth class of the sample s, e.g., $$gt(s) = \arg\max_k y_{ks},\;;$$

and $\tilde{q}_{k,s}$ denotes the prediction probability after finetuning the logits. The model parameters W and b can be determined by minimizing the NLL loss averaged over all validation samples.

However, determining the model parameters merely by minimizing the NLL loss averaged over all validation samples is sample-inefficient, as it equally weights the NLL loss of the negative (misclassified) samples and the positive (correctly classified) samples. Even though the per-sample NLL loss of the positive class is generally smaller than that of the negative class, the average NLL loss over all samples will still be dominated by the positive samples due to their much larger numbers.

The finetuning loss function may be modified by adding a modulation term which takes into consideration the prediction difficulty PD 340 of each sample. For each validation sample, an anchor probability $P_{AN}$ 335 is determined. The anchor probability $P_{AN}$ 335 is the highest prediction probability of the incorrect classes, and therefore the prediction probability on the most competing counterpart of the ground truth. In other words, of the non-ground-truth classes, the prediction probability of the most likely incorrect class is selected as the anchor probability $P_{AN}$ 335:

$$\tilde{q}_{Anchor} = \max_{k' \neq gt(s)} \tilde{q}_{k',s} \quad \text{(Eq. 4)}$$

To determine the prediction difficulty PD 340, the ground-truth prediction probability, $\tilde{q}_{gt(s),s}$, $P_{GT}$ 330 is subtracted from the anchor probability $P_{AN}$ 335. The finetuning loss function may thus take the form of an anchor loss, as defined in Eq. 5 below:

$$AL: \; -(1 + \tilde{q}_{Anchor} - \tilde{q}_{gt(s),s})^\gamma \log \tilde{q}_{gt(s),s} = \quad \text{(Eq. 5)}$$
$$(1 + \tilde{q}_{Anchor} - \tilde{q}_{gt(s),s})^\gamma NLL$$

where γ>0 is a hyper-parameter.

As is shown in Eq. 5, the anchor loss is merely the NLL loss with a modulation term comprising the prediction difficulty PD 340. Although in this example, NLL loss was used, this result is also obtained with other losses, such as Brier score loss or hinge loss. Thus, the finetuning loss function FTF 350 may comprise a loss, such as NLL, Brier score or hinge loss, modulated by a modulation term based on the prediction difficulty PD 340.

When the ground truth is not the top prediction, the modulation term upscales the NLL loss, since the anchor probability $P_{AN}$ 335 is greater than the ground truth prediction probability $P_{GT}$ 330. Otherwise, if the ground truth is the top prediction, the modulation term downscales the NLL, because the ground truth predicted probability $P_{GT}$ 330 is greater than the anchor probability $P_{AN}$ 335. This upscaling and downscaling is in proportion to the prediction difference, e.g., the prediction difficulty PD 340, between the ground truth prediction and its competing counterpart prediction.

The finetuning model is thus trained by training the finetuning model parameters. Training the finetuning model parameters comprises, for each sample, determining a ground truth prediction probability $P_{GT}$ 330 and an anchor probability $P_{AN}$ 335 from the output logit vector A of said validation sample as described above. The ground truth prediction probability $P_{GT}$ 330 and the anchor probability $P_{AN}$ 335 are then used to determine the prediction difficulty PD 340. The prediction probability PD 340 may then be used in the modulation term of the finetuning loss function FTF 350. The finetuning loss function FTF 350 is further dependent on the finetuning model parameters FMP' 345—in the above example, W and b. The finetuning model parameters FMP' 345 are adjusted in order to minimize the finetuning loss function FLF 350 through the optimization, depicted by the dashed box OPT 355. After optimization, the determined finetuning model parameters FMP 360 are output and stored. The finetuning model parameters FMP 360 may then be used in trained calibration module for finetuning logits of a trained classification model prior to classifying a sample input.

In an embodiment, the loss is modulated based on a focal loss (FL) rather than the anchor loss. The focal loss is based solely on the ground truth prediction probability, and describes the uncertainty associated with the ground truth class. The modulation term based on focal loss is given below in Eq. 6:

$$FL : (1 - \tilde{q}_{gt(s),s})^\gamma NLL \quad \text{(Eq. 6)}$$

Using the focal loss therefore scales down the loss when the prediction probability of the ground truth class is sufficiently high. Focal loss or anchor loss may be advantageous based on the case at hand. For example, focal loss may depress loss values for samples which are easy to classify, whilst using anchor probability dynamically re-scales the loss based on how the difficulty of classifying a sample. For samples whose classifications are moderate or hard, the use of anchor probability in the loss function may provide a better finetuning result. For this reason, although focal loss may provide a quicker computation for easily classifiable samples, use of anchor probability is dynamic based on prediction difficulty and can thus be applied more generally.

FIG. 4 shows a detailed, yet non-limiting, example of training a calibration module using a binning optimization scheme according to an embodiment of the present invention.

A plurality of validation samples VS 305 may be provided to a trained classification model TCM 310. Each validation sample comprises an input instance, such as an image or document or the like, and ground-truth classification which indicates the true classification of the input instance. The trained classification model TCM 310 may be a classification model that has been previously trained, either by a training method within the same system as calibration system 100, or an external training system. The trained classification model TCM 310 may comprise a deep neural network. The trained classification model TCM 310 may be a multiclass classifier configured to classify an input into one or more of K classes, for example a multiclass multilabel classifier which can classify a single input into multiple classification labels.

After inputting a validation sample VS 305 to the trained classification model TCM 310, an output logit vector may be obtained from the trained classification model TCM 310. More specifically, the output logit vector may be the output of a layer of the DNN preceding the last activation layer of the trained classification model TCM 310. The last activation layer may be, for example, a softmax activation layer or a sigmoid activation layer. For example, if the trained classification model TCM 310 is trained to classify a sample into one or more of K classes, the output logit vector $\lambda$ may be $\lambda = \{\lambda_0, \ldots, \lambda_K\}$.

As described previously, the calibration module may comprise one or both of the finetuning submodule FT 320 and the binning submodule Bin 325. In embodiments where both the finetuning submodule FT 320 and the binning submodule Bin 325 are used, it may be preferable for the operations of the binning submodule Bin 325 to be performed after the operations of the finetuning submodule FT 320 are performed, e.g., for binning the finetuned output logit vector. More specifically, it may be advantageous that the output logit vectors are finetuned prior to the scalar logits being quantized. That is, the output logit vectors may be finetuned prior to being cast into the binary classifications, or equivalently, the output logit vectors may first be cast into the binary classifications and the resulting binary classifications (e.g., the binary scalar label $\bar{y}$ and the scalar logit $\bar{\lambda}$) may be finetuned according to the method of FIG. 3. This has been found to provide a greater improvement than either the finetuning or the binning individually. The output logit vector obtained from the trained classification model TCM 310 may be referred to as the raw output logit vector, and an output logit vector that has been finetuned, for example according to the method of FIG. 3, may be referred to as the finetuned output logit vector. Both the raw output logit vector and the finetuned output logit vector are examples of output logit vectors.

The binning submodule Bin 325 may cast the output logit vector (e.g., the raw output logit vector or the finetuned output logit vector) into a set of binary classifications BC 430. Casting a multiclass classification logit vector into a set of binary classifications may be performed in several ways, such as by using a top-k prediction calibration or by using a class-wise prediction calibration. Each binary classification comprises a binary scalar label $\bar{y}$ and a scalar logit $\bar{\lambda}$.

A top-k prediction calibration focuses on whether the top k predictions are correct. In the simplest case, such as in a multiclass classifier that is not a multilabel classifier, this becomes a top-label (e.g., a top-1) prediction calibration which focuses on whether the top prediction is correct. In this case, the binary scalar label y encodes 1

$$\left( \arg\max_k y_k \right),$$

where is an $1(\bullet)$ indicator function and $y_k$ is the label of the kth class, and the scalar logit becomes $$\bar{\lambda} \triangleq \log \max_k q_k - \log\left(1 - \max_k q_k\right).$$

In the more general case, where the classifier outputs the top k predictions, the scalar logit becomes $\bar{\lambda} \triangleq \log \Sigma_i q_i - \log(1 - \Sigma_i q_i)$, where $i \in I$ and I denotes the set of k top predictions.

The class-wise prediction calibration casts the output logit vector (or the finetuned output logit vector) into K binary classifications. Each binary classification provides an inference of whether the label is in the class k or not. That is, the binary scalar label y encodes $1(y_k=1)$. The prediction probability of the class 1, i.e., $y_k=1$, is the sigmoid response of the scalar logit, $\bar{\lambda} \triangleq \log q_k - \log(1-q_k)$.

Once the output logits (or finetuned output logits) have been cast into the binary classifications BC 430 they may be quantized, e.g., through the use of bins. The scalar logits are sorted into bins defined by bin boundaries, and all of the entries (e.g., the scalar logits) in the same bin will be represented by a single common value, known as the bin representative. Existing binning schemes accomplish this either by defining an equal width binning scheme, in which an interval is divided evenly into a number of bins, or by defining bin boundaries such that each bin contains the same number of entries, known as equal mass binning. However, in both of these binning schemes, the label information conveyed by the scalar logit (e.g., $P(\bar{y}|\bar{\lambda})$) is not taken into consideration. The binning submodule Bin 325 therefore defines the bin boundaries such that the mutual information between the label information $\bar{y}$ and the binning (e.g., quantization) function $Q(\bar{\lambda})$ operating on the scalar logit $\bar{\lambda}$, as shown in the expression below:

$$\max_Q I(y; Q(\lambda)); QQ: \lambda \mapsto \hat{\lambda} \quad \text{(Eq. 7)}$$

where $\hat{\lambda}$ represents the quantized logit.

The solution of Eq. 7 is the optimal encoder to maximally preserve the label information given in the quantization budget, e.g., the number of bins, according to Shannon's theory.

An equivalent problem to that of Eq. 7 may therefore be defined, independent of the setting of $(\bar{y}, \bar{\lambda})$, as elucidated below.

The quantizer $Q: \bar{\lambda} \mapsto \hat{\lambda}$ may be defined as shown below in Eq. 8:

$$Q(\bar{\lambda}) = r_i \text{ if } \bar{\lambda} \in (g_i, g_{i+1}] i=0, \ldots, M-1 \quad \text{(Eq. 8)}$$

where $g_0 = -\infty \leq g_1 \leq g_2 \leq \ldots \leq g_{M-1} < g_M = \infty$ define the bin boundaries, and $\{r_i\}_{i=0,\ldots,M-1}$ are the associated bin representatives.

In terms of the probability density function $p(\bar{\lambda}|\bar{y})$, the probability mass function $P(\bar{y})$, the bin boundaries $\{g_i\}$ BB 435 and the bin representatives $\{r_i\}$, the maximization of mutual information is equivalent to:

$$\max_Q I(y; Q(\lambda)) \equiv \min_{g_i, \phi_i} \mathcal{L}(\{g_i, \phi_i\}) \quad \text{(Eq. 9)}$$

where the binning loss function $\mathcal{L}(\{g_i, \varphi_i\})$ BLF 440 is defined as shown in Eq. 10 below:

$$\mathcal{L}(\{g_i, \phi_i\}) \triangleq \quad \text{(Eq. 10)}$$

$$\sum_{y' \in \{0,1\}} P(\bar{y} = y') \sum_{i=0}^{M-1} P(\hat{\lambda} = r_i | \bar{y} = y') \cdot \log(1 + e^{(1-2y')\phi_i}) - H(y)$$

and where $\{\varphi_i\}$ denote a set of auxiliary variables, or binning optimization variables BOP 445 introduced to ease the optimization.

In some embodiments, the binning loss function $\mathcal{L}(\{g_i, \varphi_i\})$ BLF 440 may be minimized by finding bin boundaries $\{g_i\}$ BB 435 and binning optimization variables $\{\phi_i\}$ that minimize the binning loss function BLF 440. The bin boundaries $\{g_i\}$ may be updated UBB 455 using a gradient descent, by computing the derivative with respect to the bin boundary $g_i$:

$$\frac{\partial \mathcal{L}}{\partial g_i} = \sum_{y' \in \{0,1\}} P(y=y') p(\lambda = g_i | y = y') \cdot \log\left[\frac{1+e^{(1-2y')\phi_{i-1}}}{1+e^{(1-2y')\phi_i}}\right] = \quad \text{(Eq. 11)}$$

$$p(\lambda = g_i) \sum_{y' \in \{0,1\}} P(y = y' | \lambda = g_i) \cdot \log\left[\frac{1+e^{(1-2y')\phi_{i-1}}}{1+e^{(1-2y')\phi_i}}\right]$$

In some embodiments, the bin boundaries may also be updated using a closed-form calculation. Since $p(\bar{\lambda}=g_i)$ is positive, the stationary point equation for $g_i$ is:

$$P(y=1|\lambda=g_i)\log\left[\frac{1+e^{-\phi_{i-1}}}{1+e^{-\phi_i}}\right] = P(y=0|\lambda=g_i)\log\left[\frac{1+e^{\phi_i}}{1+e^{\phi_{i-1}}}\right]$$

$$\log\frac{P(y=1|\lambda=g_i)}{P(y=0|\lambda=g_i)} = \log\left\{\frac{\log\left[\frac{1+e^{\phi_i}}{1+e^{\phi_{i-1}}}\right]}{\log\left[\frac{1+e^{-\phi_{i-1}}}{1+e^{-\phi_i}}\right]}\right\} \quad \text{(Eq. 12)}$$

The left-hand side of Eq. 12 is a function of $g_i$. If the function is invertible, the value of $g_i$ can be calculated directly. Otherwise, a look-up table may be constructed for approximating the value of $g_i$ that yields the right-hand-side term of Eq. 13 below, which is obtained from Bayes' Theorem. The obtained value is then the stationary point for $g_i$.

$$\log\frac{P(y=1|\lambda)}{P(y=0|\lambda)} = \log\frac{P(y=1)p(\lambda|y=1)}{P(y=0)p(\lambda|y=0)} \quad \text{(Eq. 13)}$$

There is also a special case of Eq. 13, in which $p(y=1|\bar{\lambda})=S(\bar{\lambda})$, where $S(\bar{\lambda})$ is the sigmoid function. In this special case, the left hand side of Eq. 13 becomes simply $g_i$.

Given the bin boundaries $\{g_i\}$ BB 435, the stationary point of the binning loss function of the variables $\{\phi_i\}$ BOP 445 is expressed as:

$$\phi_i = \log\left\{\frac{P(y=1)\int_{g_i}^{g_{i+1}} p(\lambda|y=1)d\lambda}{P(y=0)\int_{g_i}^{g_{i+1}} p(\lambda|y=0)d\lambda}\right\} \quad \text{(Eq. 14)}$$

In this way, updating UBOP 450 the variables $\{\phi_i\}$ BOP 445 is done in closed-form.

In some embodiments, however, the variables $\{\phi_i\}$ BOP 445 are updated UBOP 450 also using a gradient descent, by taking the partial derivative of the binning loss function BLF 440 with respect to $\varphi_i$, as shown in Eq. 15:

$$\frac{\partial \mathcal{L}}{\partial \phi_i} = \sum_{y' \in \{0,1\}} P(y = y') \left[ \int_{g_{i-1}}^{g_i} p(\lambda | y = y') d\lambda \right] \cdot \frac{(1-2y')e^{(1-2y')\phi_i}}{1 + e^{(1-2y')\phi_i}} \quad \text{(Eq. 15)}$$

Both $\{g_i\}$ and $\{\phi_i\}$ may be iteratively and alternately updated in respective updating operations UBB 455 and UBOP 450.

Once the bin boundaries $\{g_i\}$ have been determined by minimizing the binning loss function BLF 440, the final bin boundaries FBB 460 are established. The final bin boundaries FBB 460 are then used to determine the bin representatives BR 465.

Each bin is defined as the interval between two consecutive bin boundaries, for example the interval of $[g_i, g_{i+1}]$. For each bin, a bin representative is established. The bin representative is a value which will be used to represent the logits that fall within the bin. There are several ways of determining the bin representative. The bin representative value may be used as the adjusted prediction probability of a sample, for example when the trained binning scheme is in use for adjusting prediction probabilities.

In some embodiments of the present invention, the bin representative is determined based on the samples, e.g., logits, within the bin. Each logit is associated with a validation sample, which has a corresponding ground-truth label. The proportion of logits in the bin which are associated with a validation sample having the same ground-truth label may then be determined. This proportion may then be used to obtain a corresponding prediction probability, which is set as the bin representative.

For example, a bin may contain logits which correspond to 1000 samples. Of these 1000 samples, 80% of the samples have the ground truth label "1". This means that the calibrated probability of the label of a test sample that falls into this bin being "1" would also be 80%, or 0.8. The bin representative for this bin would then be set as 0.8.

In some embodiments, the output logit vectors may be finetuned as described in FIG. 3 prior to being input into the binning submodule Bin 325. In this case, the logits being quantized by the binning submodule Bin 325 are finetuned, for example using a matrix scaling model or Dirichlet calibration model whose parameters have been determined as described with reference to FIG. 3. In this case, the bin representative of a particular bin may be determined by calculating an average of the sigmoids of the logits that fall within said bin.

In some embodiments, the raw output logit vectors may be cast into the set of binary classifications BC 430. The bin boundaries may be determined as described above, based on the binary classifications BC 430. The bin representatives BR 465 may be determined by finetuning the scalar logits of the binary classifications BC 430 according to the method of FIG. 3.

The final bin boundaries FBB 460 and the bin representatives BR 465 may then be used to define the binning scheme, and may be stored in the calibration module CalMod 315.

In some example embodiments of the present invention, the set of validation samples may be constructed for training the calibration module CalMod 315 for each particular class. In other words, multiple sets of validation samples may be used to train a finetuning model and/or a binning scheme for calibrating each class. In such a case, the methods of FIG. 3 and FIG. 4 are repeated for each class, e.g., for each set of validation samples. For example, to calibrate a multiclass classifier for classifying K classes, K validation sets may be used—one for each class. Each class may then have its own finetuning and/or binning scheme. For example, one class may be calibrated by finetuning the logits corresponding to that class prediction with a finetuning model having parameters $W_1$ and $b_1$, whereas a second class may be calibrated by finetuning the logits corresponding to that second class with a finetuning model having parameters $W_2$ and $b_2$, and so on. Similarly, a first class may be binned according to a first binning scheme, for example having bin boundaries $\{g\}$ and bin representatives $\{r\}$ and a second class may be binned according to a second binning scheme, for example having bin boundaries $\{g'\}$ and bin representatives $\{r'\}$.

In some example embodiments of the present invention, a single set of validation samples may be used to train a single finetuning model and/or a single binning scheme for calibrating all K classes. For example, validation sets for multiple classes, or even all classes, may be merged into a single validation set. Then, a single finetuning and/or binning scheme may be determined for all classes, according to the method(s) of FIG. 3 and/or FIG. 4. This may be referred to as a shared class-wise calibration.

Figure 5A:
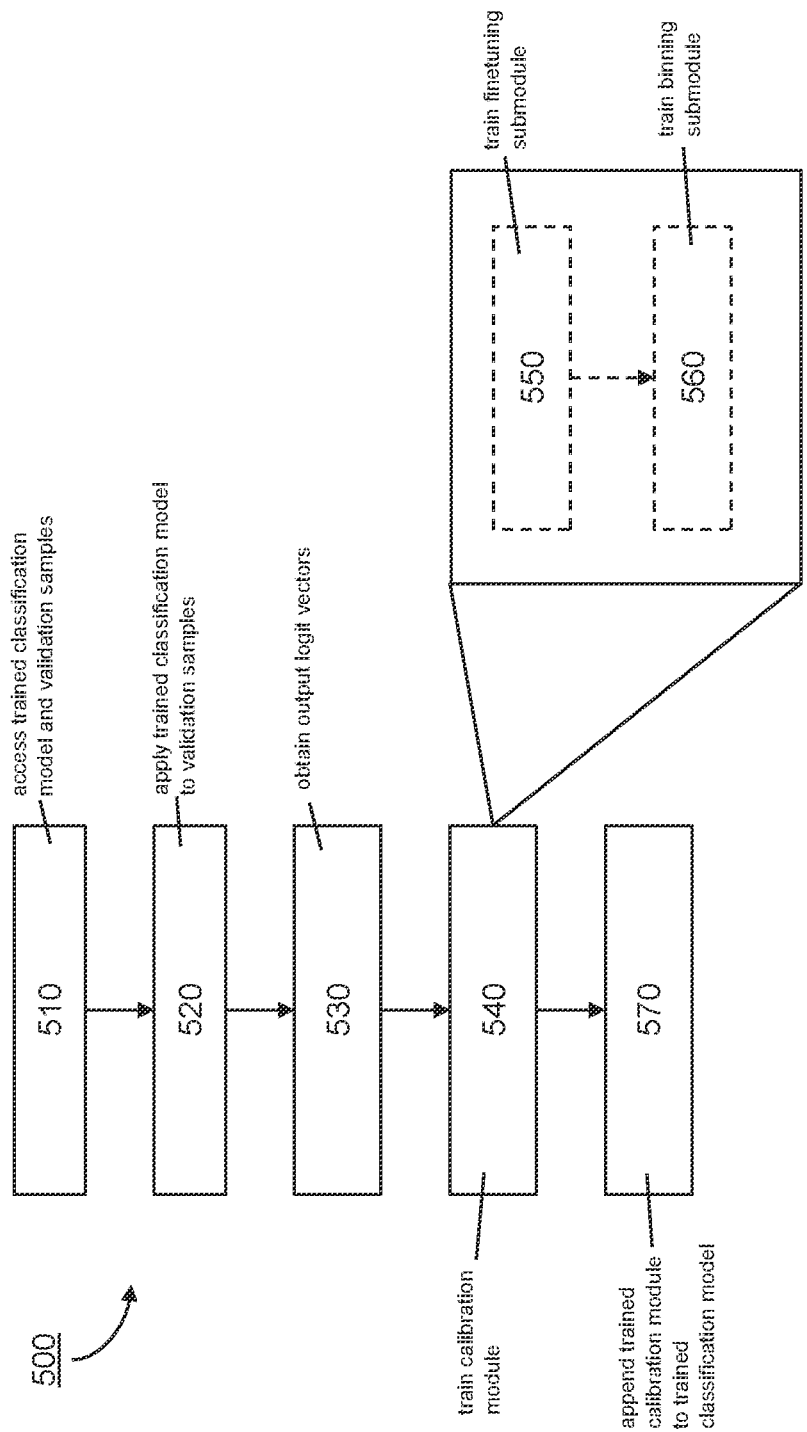
FIG. 5a shows a computer-implemented method for training a calibration module according to an example embodiment of the present invention.

FIG. 5a shows a block diagram of a computer-implemented method 500 for training a calibration module according to an example embodiment of the present invention. The method 500 may correspond to an operation of the calibration system 100 of FIG. 1. However, this is not a limitation, in that the method 500 may also be performed using another system, apparatus or device.

The method may comprise, in an operation entitled "ACCESS TRAINED CLASSIFICATION MODEL AND VALIDATION SAMPLES", accessing 510 a trained classification model and a plurality of validation samples. The trained classification model may be trained to classify a sample input into one or more of K classes and to provide associated prediction probabilities. The trained classification model may be trained by any training means. Each validation sample comprises a sample input and a corresponding ground-truth label indicating the true classification of the sample input. The trained classification model and the validation samples may be accessed separately, e.g., from different memory locations. For example, one of the trained classification model and the plurality of validation samples may be accessed from a local memory and the other may be accessed remotely.

The method may comprise, in an operation entitled "APPLY TRAINED CLASSIFICATION MODEL TO VALIDATION SAMPLES", applying 520 the trained classification model to a plurality of validation samples. The validation samples may be input into the trained classification model.

The method may comprise, in an operation entitled "OBTAIN OUTPUT LOGIT VECTORS", obtaining 530, for each validation sample, an output logit vector. The output logit vector, $\lambda$, may comprise logits for each class k of the K classes, e.g., $\lambda = \{\lambda_0, \ldots, \lambda_K\}$.

The method may comprise, in an operation entitled "TRAIN CALIBRATION MODULE", training 540 a calibration module to determine a calibrated, or adjusted, prediction probability of a classification of a sample input. The output logit vectors and associated ground truth labels may be input into the calibration module in order to train the calibration module. The calibration module may comprise at least one of a finetuning submodule and a binning submodule.

Training 540 the calibration module may comprise, in a sub-operation entitled "TRAIN FINETUNING SUBMODULE", training 550 the finetuning submodule. The method of training the finetuning submodule is described in further detail with reference to FIG. 5*b*.

Training 540 the calibration module may comprise, in a sub-operation entitled "TRAIN BINNING SUBMODULE", training 560 the binning submodule in order to obtain a binning scheme. The method of training the binning submodule is described in further detail with reference to FIG. 5*c*.

In some example embodiments of the present invention, training 540 the calibration module may comprise both training 550 the finetuning submodule and training 560 the binning submodule. In such cases, it is preferable for the finetuning submodule to be trained and the output logit vectors to be finetuned by the trained finetuning submodule prior to training the binning submodule and subsequently applying the resulting binning scheme. That is, if both the finetuning submodule and the binning submodule are being trained, it is preferable that the outputs of the finetuning submodule, e.g., the finetuned output logit vectors, are used as the inputs of the binning submodule.

The method may comprise, in an operation entitled "APPEND TRAINED CALIBRATION MODULE TO TRAINED CLASSIFICATION MODEL", appending 570 the trained calibration module to the trained classification model in order to obtain a calibrated classification model.

Although not depicted in FIG. 5*a*, the method 500 may further comprise evaluating the calibrated classification model, e.g., the trained classification model with the trained calibration module appended thereto, with test data to assess the calibration.

FIG. 5*b* shows a block diagram of a computer-implemented method 550 for training a finetuning submodule of a calibration module according to an embodiment of the present invention. The method 550 may correspond to an operation of the calibration system 100 of FIG. 1. However, this is not a limitation, in that the method 550 may also be performed using another system, apparatus or device.

The method may comprise, in an operation entitled "DETERMINE GROUND-TRUTH PROBABILITY", determining 552, for each validation sample, a ground-truth probability. The ground-truth probability is the prediction probability associated with the ground-truth class for said validation sample. That is, the output logit vector of the validation sample may be used to obtain a prediction probability for each of the K classes, one of which is the ground-truth class of the validation sample. The prediction probability may be determined from the output logit vector according to a finetuning model, such as a parametric model accepting the output logit vector as an input.

The method may comprise, in an operation entitled "DETERMINE ANCHOR PROBABILITY", determining 553, for each validation sample, an anchor probability. The anchor probability is defined as the probability corresponding to the incorrect class with the highest probability. For example, if the trained classification model is trained to classify a sample input into 5 classes, A, B, C, D and E, and if the validation sample has a ground-truth class C, then the incorrect classes would be A, B, D and E. The anchor probability would then be the highest probability from the probabilities of A, B, D and E. In other words, the anchor probability represents the probability of the most competing incorrect class.

The method may comprise, in an operation entitled "DETERMINE PREDICTION DIFFICULTY", determining 554, for each validation sample, a prediction difficulty by subtracting the ground-truth probability from the anchor probability.

The method may comprise, in an operation entitled "DETERMINE MODEL PARAMETERS", determining 555, the parameters of the finetuning model. The finetuning model may be a matrix scaling model or a Dirichlet calibration model, for example. The parameters of the finetuning model may be determined by minimizing a finetuning loss function averaged over the plurality of validation samples. The finetuning loss function may comprise a modulation term based on the prediction difficulty for each validation sample.

The method may comprise, in an operation entitled "STORE TRAINED FINETUNING MODEL", storing 556 the trained finetuning model. The trained finetuning model may comprise the model parameters determined in operation 555. The trained finetuning model may be stored in the calibration module.

The method may comprise, in an optional operation entitled "FINETUNE OUTPUT LOGIT VECTORS", finetuning 557 the output logit vectors of each validation sample. This operation may be present in embodiments which further comprise training the binning submodule, as the binning submodule may be trained using the finetuned output logit vectors, e.g., after the finetuning submodule has been trained and applied.

It should be noted that the order depicted in FIG. 5*b* is not a required ordering, and it is possible for the operations described therein to be performed simultaneously or in a different sequence. For example, operations 552 and 553 may be performed simultaneously, or operation 553 may be performed before operation 552.

FIG. 5*c* shows a block diagram of a computer-implemented method 560 for training a binning submodule by determining a binning scheme according to an embodiment of the present invention. The binning scheme is defined by bin boundaries, which define the intervals of each bin, and bin representatives, which are used to represent any sample falling into a respective bin. The method 560 may correspond to an operation of the calibration system 100 of FIG. 1. However, this is not a limitation, in that the method 560 may also be performed using another system, apparatus or device.

The method may comprise, in an operation entitled "CAST OUTPUT LOGIT VECTORS", casting 562 each output logit vector into a set of binary classifications. Each binary classification may comprise a binary label and an associated scalar logit.

The method may comprise, in an operation entitled "DETERMINE BIN BOUNDARIES", determining 563 the bin boundaries of the binning scheme by minimizing a binning loss function. In order to maximize the amount of mutual information between the label information and the quantized logits (the quantized logits being quantized based on the binning scheme), the binning loss function is used as an equivalent problem. The binning loss function may be parameterized by the bin boundaries and by a set of auxiliary variables. The auxiliary variables may be provided merely to ease the optimization. The binning loss function may then be minimized, which is equivalent to maximizing the mutual information, thus determining the bin boundaries and auxiliary variables that minimize the binning loss function.

The method may comprise, in an operation entitled "QUANTIZE OUTPUT LOGIT VECTORS", quantizing 564 the scalar logits into bins defined by the bin boundaries established in operation 563.

The method may comprise, in an operation entitled "DETERMINE BIN REPRESENTATIVES", determining 565 the bin representatives for each bin. The bin representative of a particular bin may be a value for representing the quantized scalar logits falling within that bin, e.g., falling between the bin boundaries defining said bin. The bin representatives may be determined based on the quantized scalar logits falling within each bin. For example, in a particular bin, the proportion of the scalar logits corresponding to a validation sample having a particular ground-truth class may be used as a prediction probability of a test sample falling within said bin having the classification of said particular ground-truth class. The prediction probability may then be used as the bin representative for said bin. In another example, if the output logit vectors were finetuned prior to being cast as binary classifications and subsequently quantized, the bin representative of a bin may be determined by calculating the average of the sigmoid responses of the quantized scalar logits within said bin.

The method may comprise, in an operation entitled "STORE BINNING SCHEME", storing 566 the binning scheme. The binning scheme is defined by the bin boundaries established in operation 563 and by the bin representatives established in operation 565. The binning scheme, e.g., the bin boundaries and the bin representatives, may be stored by the binning submodule of the calibration module.

It will be appreciated that, in general, the operations of method 500 of FIGS. 5*a*, 5*b* and 5*c* may be combined and performed in any suitable order, e.g., consecutively, simultaneously, or a combination thereof, subject to, where applicable, a particular order being necessitated, e.g., by input/output relations. For example, when both binning and finetuning are used, operation 562 may be performed before or after the method 550 of FIG. 5*b*.

FIG. 6 shows a block diagram of a computer-implemented method 600 for classifying an input sample according to an example embodiment of the present invention. The method 600 may correspond to an operation of the classification system 200 of FIG. 2. However, this is not a limitation, in that the method 600 may also be performed using another system, apparatus or device.

The method may comprise, in an operation entitled "OBTAIN INPUT SAMPLE", obtaining 610 an input sample. The input sample may be obtained from a memory, such as a local or external memory, a server, a remote entity such as a cloud, or from a networked device. The input sample may be obtained from a sensor coupled to the system carrying out the method. For example, the input sample may be an image obtained from a camera. However, this is not a limitation. The input sample may be an audio sample, a video, lidar, radar, text, or the like, or a combination thereof.

The method may comprise, in an operation entitled "INPUT SAMPLE TO TRAINED CLASSIFICATION MODEL", inputting 620 the input sample to the trained classification model. The trained classification model may be trained to classify an input sample into one or more of K classes and to provide associated prediction probabilities. The trained classification model may comprise a deep neural network comprising a plurality of hidden layers between the input layer and the output layer, and may include at least one activation layer.

The method may comprise, in an operation entitled "OBTAIN OUTPUT LOGIT VECTOR", obtaining 630 an output logit vector from the trained classification model. More specifically, the output logit vector may be the output of a layer of the trained classification model preceding the last activation layer.

The method may comprise, in an operation entitled "CALIBRATE OUTPUT LOGIT VECTOR", calibrating 640 the output logit vector. Calibrating the output logit vector may also be referred to as adjusting a prediction probability. A prediction probability is typically derived from an output logit vector, and calibrating the output logit vector adjusts the prediction probability derived from said output logit vector. In other words, by calibrating, or adjusting, the output logit vector, the prediction probability derived from the output logit vector is adjusted or calibrated. The output logit vector may be passed as an input to the calibration module. The calibration module may comprise at least one of a finetuning submodule and a binning submodule. The finetuning submodule may comprise a trained finetuning model, for example trained according to the method of FIG. 3 and FIG. 5*b*. Calibrating the output logit vector may comprise finetuning the output logit vector by applying the trained finetuning model to the output logit vector to obtain the calibrated prediction probability. The binning submodule may comprise a binning scheme defining bin boundaries and bin representatives, determined for example according to the method of FIG. 4 and FIG. 5*c*. Calibrating the output logit vector, or the finetuned logit vector if calibrating the output logic vector also comprises finetuning the logit vector, may comprise casting the output logit vector (or the finetuned logit vector) into a set of binary classifications, each comprising a binary label and a scalar logit, and, for each class, binning the scalar logit according to the bin boundaries. The scalar logit may then be represented by the bin representative for the bin into which the scalar logit is binned. Said bin representative value may then be provided as the prediction probability associated with the respective class.

The method may comprise, in an operation entitled "OUTPUT CLASSIFICATION", outputting 650 the classification of the input sample. The classification may comprise the prediction probability for one or more classes. In some embodiments, the class with the highest prediction probability may be output as the classification, e.g., as a final decision. In some embodiments, the classification, including the adjusted prediction probability, may be output by the calibration module. In some embodiments, the adjusted prediction probability may be output by the calibration module whilst the classification decision (e.g., the most probable class or top-k classes, etc.) may be output by the classification model.

It will be appreciated that, in general, the operations of method 500 of FIGS. 5*a*, 5*b* and 5*c* and method 600 of FIG. 6 may be performed in any suitable order, e.g., consecutively, simultaneously, or a combination thereof, subject to, where applicable, a particular order being necessitated, e.g., by input/output relations. Some or all of the methods may also be combined, e.g., method 600 of applying a trained calibration module may be applied subsequently to this trained calibration module being trained according to method 500.

The method(s) may be implemented on a computer as a computer-implemented method, as dedicated hardware, or as a combination of both. As also illustrated in FIG. 7, instructions for the computer, e.g., executable code, may be stored on a computer readable medium 700, e.g., in the form of a series 710 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows an optical disc 700.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments.

Use of the verb "comprise" and its conjugations does not exclude the presence of elements or steps other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device enumerated by several means, several of these means may be embodied by one and the same item of hardware. The mere fact that certain measures are described separately does not indicate that a combination of these measures cannot be used to advantage.

What is claimed is:

1. A computer-implemented method of calibrating a trained classification model which is trained to classify input samples according to a plurality of classes and to provide associated prediction probabilities, the trained classification model including a plurality of hidden layers and at least one activation layer, the method comprising the following steps:
    accessing the trained classification model;
    accessing a plurality of validation samples, each validation sample of the validation samples having a ground-truth label, the ground-truth label indicating a ground-truth class;
    applying the trained classification model to the plurality of validation samples;
    obtaining, for each validation sample of the validation samples, an output logit vector from a layer of the trained classification model preceding a last activation layer;
    training a calibration module for adjusting prediction probabilities, the prediction probabilities being derived from output logit vectors, the calibration module including at least one of a finetuning submodule for adjusting the prediction probabilities by finetuning the output logit vector and a binning submodule for adjusting the prediction probabilities by binning the output logit vector; and
    wherein the training the calibration module includes training a finetuning model wherein model parameters of the finetuning model are determined by:
        for each validation sample of the plurality of validation samples:
            determining a ground-truth probability from the output logit vector, the ground-truth probability being a predicted probability associated with the ground-truth class of the validation sample,
            determining an anchor probability from the output logit vector, the anchor probability being a highest probability of an incorrect class, and
            determining a prediction difficulty by subtracting the ground-truth probability from the anchor probability;
        determining the model parameters of the finetuning model by minimizing a finetuning loss function averaged over the plurality of validation samples, the finetuning loss function comprising a modulation term based on the prediction difficulty for each validation sample, the determined model parameters defining the trained finetuning model; and
        storing the trained finetuning model in the calibration module; and
    appending the trained calibration module to the trained classification model to obtain a calibrated classification model.

2. The method of claim 1, wherein the calibration module includes the binning submodule, the binning submodule including a binning scheme defining bin boundaries and bin representatives, and wherein the training of the calibration module includes determining the binning scheme by:
    for each validation sample of the validation samples, casting the output logit vector into a set of binary classifications, each binary classification including a binary label and an associated scalar logit;
    determining the bin boundaries by minimizing a binning loss function, minimizing the binning loss function being equivalent to maximizing mutual information between quantized scalar logits and binary labels associated with the quantized scalar logits, the binning loss function being minimized by updating the bin boundaries and a set of auxiliary variables, wherein the quantized scalar logits are quantized according to the binning scheme;
    quantizing the scalar logits into bins defined by the determined bin boundaries;
    determining, for each bin, a bin representative value for representing the quantized scalar logits in the bin; and
    storing the bin boundaries and the bin representatives defining the determined binning scheme in the calibration module.

3. The method of claim 2, wherein the minimizing of the binning loss function includes updating at least one of the bin boundaries and the auxiliary variables by using at least one of a gradient descent and a closed form calculation.

4. The method of claim 2, wherein the determining of the bin representative for each bin includes determining a proportion of validation samples whose corresponding scalar logits fall within the bin, the proportion of validation samples having a same ground truth label, and setting the bin representative of the bin to be a prediction probability corresponding to the determined proportion of validation samples.

5. The method of claim 2 wherein the casting of the output logit vector into the set of binary classifications includes one of:
    calibrating top k predictions as binary classifications using a top-k calibration, k being an integer;
    calibrating a prediction for each class of the plurality of classes using a class-wise calibration; and
    calibrating a prediction for each class of the plurality of classes using a shared class-wise calibration.

6. The method of claim 1, wherein the finetuning loss function includes at least one of a negative log-likelihood function, a Brier score function, and a hinge loss function.

7. The method of claim 1, wherein the finetuning loss function is based on a parametric model.

8. The method of claim 7, wherein the parametric model is a matrix scaling model and/or a Dirichlet calibration model.

9. The method of claim 3, further comprising, for each validation sample, finetuning the output logit vector according to the trained finetuning model, wherein the output logit vector of each validation sample of the validation samples are finetuned prior to being quantized, and wherein the determining of the bin representative for each bin includes:
- for each scalar logit falling within the bin, calculating a sigmoid response of the scalar logit,
- determining an average of the calculated sigmoid responses across the validation samples falling within the bin, and
- setting the bin representative of the bin to be the determined average.

10. A system for calibrating a trained classification model which is trained to classify input samples according to a plurality of classes and to provide associated prediction probabilities, the trained classification model including a plurality of hidden layers and at least one activation layer, the system comprising:
- a data interface configured to:
  - access the trained classification model, and
  - access a plurality of validation samples; and
- a processor subsystem configured to:
  - apply the trained classification model to the plurality of validation samples,
  - obtain, for each validation sample of the validation samples, an output logit vector from a layer of the trained classification model preceding a last activation layer;
  - train a calibration module for adjusting prediction probabilities, the prediction probabilities being derived from output logit vectors, the calibration module including at least one of a finetuning submodule for adjusting the prediction probabilities by finetuning the output logit vector and a binning submodule for adjusting the prediction probabilities by binning the output logit vector; and
- wherein the training of the calibration module includes training a finetuning model, wherein model parameters of the finetuning model are determined by:
  - for each validation sample of the plurality of validation samples:
    - determining a ground-truth probability from the output logit vector, the ground-truth probability being a predicted probability associated with t a ground-truth class of the validation sample,
    - determining an anchor probability from the output logit vector, the anchor probability being a highest probability of an incorrect class, and
    - determining a prediction difficulty by subtracting the ground-truth probability from the anchor probability;
  - determining the model parameters of the finetuning model by minimizing a finetuning loss function averaged over the plurality of validation samples, the finetuning loss function including a modulation term based on the prediction difficulty for each validation sample, the determined model parameters defining the trained finetuning model; and
  - storing the trained finetuning model in the calibration module; and
- append the trained calibration module to the trained classification model to obtain a calibrated classification system.

11. A method of using a trained classification model to classify an input sample according to a plurality of classes and to provide associated prediction probabilities, the method comprising the following steps:
- obtaining a calibrated classification model, the calibrated classification model including the trained classification model and a calibration module, wherein the trained classification model is trained to classify input samples according to a plurality of classes and to provide associated prediction probabilities, the calibration module including at least one of a finetuning submodule for adjusting the prediction probabilities by finetuning output logits and a binning submodule for adjusting the prediction probabilities by binning output logits;
- wherein model parameters of a finetuning model are determined by:
  - for each validation sample of a plurality of validation samples:
    - determining a ground-truth probability from an output logit vector, the ground-truth probability being a predicted probability associated with a ground-truth class of the validation sample,
    - determining an anchor probability from the output logit vector, the anchor probability being a highest probability of an incorrect class, and
    - determining a prediction difficulty by subtracting the ground-truth probability from the anchor probability;
  - determining the model parameters of the finetuning model by minimizing a finetuning loss function averaged over the plurality of validation samples, the finetuning loss function including a modulation term based on the prediction difficulty for each validation sample, the determined model parameters defining a trained finetuning model; and
- storing the trained finetuning model in the calibration module; and
- obtaining the input sample;
- inputting the input sample to the trained classification model;
- obtaining an output logit vector from a layer of the trained classification model preceding a last activation layer of the trained classification model;
- obtaining an adjusted prediction probability by adjusting, by the calibration module, a prediction probability, the prediction probability being derived from the output logit vector, the adjusting of the prediction probability including at least one of finetuning the output logit vector according to the trained finetuning model and binning the output logit vector according to a binning scheme; and
- outputting a classification corresponding to the input sample, the classification including the obtained adjusted prediction probability.

12. The method of claim 11, wherein the obtaining of the input sample includes obtaining the input sample from a sensor.

13. The method of claim 11, wherein the calibration model includes a binning scheme defining bin boundaries and bin representatives, and the method further comprises quantizing the output logit vector by binning the output logit vector into at least one bin according to the binning scheme and representing the output logit vector by the bin representative corresponding to the bin; and wherein the output classification includes quantized logits indicating calibrated prediction probabilities determined by the calibration module, the method further comprising transmitting the quantized logits to a central node connected to a plurality of sensors.

14. A system for using a trained classification model to classify an input sample according to a plurality of classes and to provide associated prediction probabilities, the system comprising:
a data interface configured to:
obtain the input sample;
access a calibrated classification model, the calibrated classification model including the trained classification model and a calibration module, wherein the trained classification model is trained to classify input samples according to a plurality of classes and to provide associated prediction probabilities, the calibration module including at least one of a finetuning submodule for adjusting the prediction probabilities by finetuning output logits and a binning submodule for adjusting the prediction probabilities by binning output logits;
wherein model parameters of a finetuning model are determined by:
for each validation sample of a plurality of validation samples:
determining a ground-truth probability from an output logit vector, the ground-truth probability being a predicted probability associated with a ground-truth class of the validation sample,
determining an anchor probability from the output logit vector, the anchor probability being a highest probability of an incorrect class, and
determining a prediction difficulty by subtracting the ground-truth probability from the anchor probability;
determining the model parameters of the finetuning model by minimizing a finetuning loss function averaged over the plurality of validation samples, the finetuning loss function including a modulation term based on the prediction difficulty for each validation sample, the determined model parameters defining the trained finetuning model; and
storing a trained finetuning model in the calibration module; and
a processor subsystem configured to:
input the input sample to the trained classification model;
obtain an output logit vector from a layer of the trained classification model preceding a last activation layer of the trained classification model;
obtain an adjusted prediction probability by adjusting, by the calibration module, a prediction probability, the prediction probability being derived from the output logit vector, adjusting the prediction probability comprising at least one of finetuning the output logit vector according to a trained finetuning model and binning the output logit vector according to a binning scheme; and
output a classification corresponding to the input sample, the classification including the adjusted prediction probability.

15. A non-transitory computer-readable medium on which are stored data representing instructions for calibrating a trained classification model which is trained to classify input samples according to a plurality of classes and to provide associated prediction probabilities, the trained classification model including a plurality of hidden layers and at least one activation layer, the instructions, when executed by a processor system, causing the processor system to perform the following steps:
accessing the trained classification model;
accessing a plurality of validation samples, each validation sample of the validation samples having a ground-truth label, the ground-truth label indicating a ground-truth class;
applying the trained classification model to the plurality of validation samples;
obtaining, for each validation sample of the validation samples, an output logit vector from a layer of the trained classification model preceding a last activation layer;
training a calibration module for adjusting prediction probabilities, the prediction probabilities being derived from output logit vectors, the calibration module including at least one of a finetuning submodule for adjusting the prediction probabilities by finetuning the output logit vector and a binning submodule for adjusting the prediction probabilities by binning the output logit vector; and
wherein the training the calibration module includes training a finetuning model wherein model parameters of the finetuning model are determined by:
for each validation sample of the plurality of validation samples:
determining a ground-truth probability from the output logit vector, the ground-truth probability being a predicted probability associated with the ground-truth class of the validation sample,
determining an anchor probability from the output logit vector, the anchor probability being a highest probability of an incorrect class, and
determining a prediction difficulty by subtracting the ground-truth probability from the anchor probability;
determining the model parameters of the finetuning model by minimizing a finetuning loss function averaged over the plurality of validation samples, the finetuning loss function comprising a modulation term based on the prediction difficulty for each validation sample, the determined model parameters defining the trained finetuning model; and
storing the trained finetuning model in the calibration module; and
appending the trained calibration module to the trained classification model to obtain a calibrated classification model.

* * * * *